C. S. MOSELEY.

Dust-Excluders for Watches.

No. 5,833. Reissued April 14, 1874.

Witnesses:
A. H. Sherburne
J. H. Alexander

Inventor:
Charles S. Moseley,
by A. H. Sherburne, his
Associate Attorney.

AM. PHOTO-LITHOGRAPHIC CO. N. Y. (OSBORNE'S PROCESS.)

UNITED STATES PATENT OFFICE.

CHARLES S. MOSELEY, OF ELGIN, ILLINOIS, ASSIGNOR TO THE NATIONAL WATCH COMPANY, OF SAME PLACE.

IMPROVEMENT IN DUST-EXCLUDERS FOR WATCHES.

Specification forming part of Letters Patent No. 95,128, dated September 21, 1869; reissue No. 5,833, dated April 14, 1874; application filed March 20, 1874.

*To all whom it may concern:*

Be it known that I, CHARLES S. MOSELEY, of Elgin, in the county of Kane and State of Illinois, have invented certain Improvements in Watches; and I do hereby declare the following to be a full, clear, and exact description thereof, which will enable others skilled in the art to which my invention appertains to make and use the same, reference being had to the accompanying drawings forming part of this specification, in which—

Figure 1:
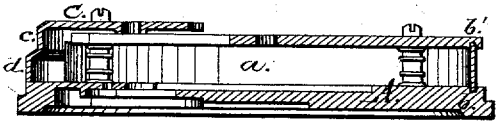
Figure 2:
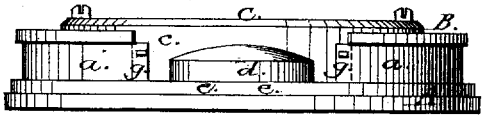
Figure 4:
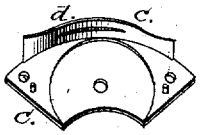
Figure 3:
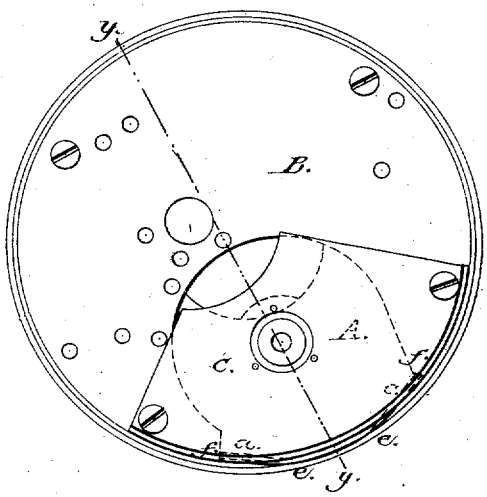

Figure 1 is a central section through the upper and lower or pillar plate of the watch, taken on the line *y y*, drawn across Fig. 3, showing a section of my said improvements. Fig. 2 is a front or side view of the same. Fig. 3 is a general plan, and Fig. 4 is a diminished perspective view of the barrel-bridge detached.

Similar letters of reference indicate like parts in the several figures of the drawing.

The object of my invention is to close the opening through the top plate, under the outer edge of the barrel-bridge, as well as to close the space between the top plate and pillar-plate, around the moving parts of the watch, whereby the exclusion of dust from the watch-movement is completely accomplished; and to that end it consists in providing the bridge with a projecting lip extending between the top and pillar plate, and through the opening in the top plate, at its outer edge, whereby said opening is properly closed. It further consists in providing each of the approximate faces of the top and pillar plate, near their periphery, with an annular groove, into which is fitted a sheet-metal band, so arranged as to bear against the side of the lip, whereby the entire space between the two plates around the moving parts of the watch is tightly closed.

As the present invention relates only to the mechanism employed in excluding dust from the moving parts, a description of the latter is not necessary to be herein particularly given.

In the accompanying drawing, A represents the lower or pillar plate, and B the top plate, which are of the usual form. C is the barrel-bridge, which is attached to the top plate over the opening in the ordinary manner. This bridge is provided at its outer edge with a depending lip, *c*, which is made from a portion of the bridge bent at a right angle to its plan, and so arranged as to pass through the opening in the plate and extend to the pillar-plate, as shown in Fig. 2. The lower portion of this lip *c* is swaged outward at its center, forming an internal recess, *d*, (shown in Fig. 1,) the object of which is to allow the lip to pass over the barrel-gear without coming in contact therewith. The approximate faces of the plates A B are each provided, near their periphery, with an annular groove, *b*, as shown in Fig. 1. The diameter of the circle of these grooves is equal, and in the top plate the groove extends from the edges of the opening around the plate; but in the pillar-plate the groove diverges from the circle at or near the points *f f*, and, pursuing a straight line therefrom, passes out at the edge of the plate at or near the points *e e*, Figs. 2 and 3. *a a* are thin strips of sheet metal, which are so arranged as to fit closely into the grooves *b b*. These strips butt together at a point near the center of the plate, opposite to the center of the lip, and extend from such point around within the grooves sufficiently far to lap over the outer surface of the lip, as shown in Fig. 2. The strips *a a* are usually made of sheet-brass, but may be made of any suitable sheet metal having sufficient flexibility to adapt itself to the curve of the grooves, and at the same time cause the ends of the strips to bear tightly against the surface of the lip. The outer ends of the strips are each provided with a hole or projection, into or against which to place any suitable instrument for removing the strips when necessary.

It is obvious that, if preferred, the two strips *a a* may be made in one piece, instead of two, and used in the same manner; but, in any event, the ends should lap over the surface of the lip, and bear firmly against the same, so as to insure a tight joint.

I am aware that so-called "dust-rings" have been previously used, but such are imperfect, for the following reasons, to wit: The ring is of uniform width, and extends only from the pillar-plate to the lower surface of the top plate; consequently the opening in the top plate, under the outer edge of the bridge, remains unclosed. Besides, in order to enable the ring to be attached its diameter must be such as to pass loosely around the top plate; consequently, the joint between the inner surface of the ring and outer edge of the plate must be more or less open, while with my invention these difficulties are entirely overcome, for the lip passes through the opening in the top plate, tightly closing the same, and the strips pass through the grooves and lap over and partially around the lip, forming a continuous band, which tightly closes the space between the two plates; consequently the entire opening around the watch-movement is so closed as to completely exclude dust from the interior of the watch.

Having thus described my invention, I claim—

1. The bridge C, provided with the lip *c*, arranged to close the opening in the top plate, as specified.

2. The plates A B, provided with grooves *b* *b'*, as and for the purpose specified.

3. The metallic strips *a a*, arranged to lap upon the surface of the lip, in combination with the plates A B, as specified.

4. In combination with the strips *a a*, the lip *c*, having the recess *d*, and arranged to extend from the lower surface of the bridge to the pillar-plate, as described.

NATIONAL WATCH COMPANY,

By HIRAM REYNOLDS, *Secretary.*

Witnesses:

F. C. GOODWIN,

JNO. H. WHIPPLE.